(No Model.)
R. A. AUSTIN.
HOSE COUPLER.
No. 402,219.  Patented Apr. 30, 1889.
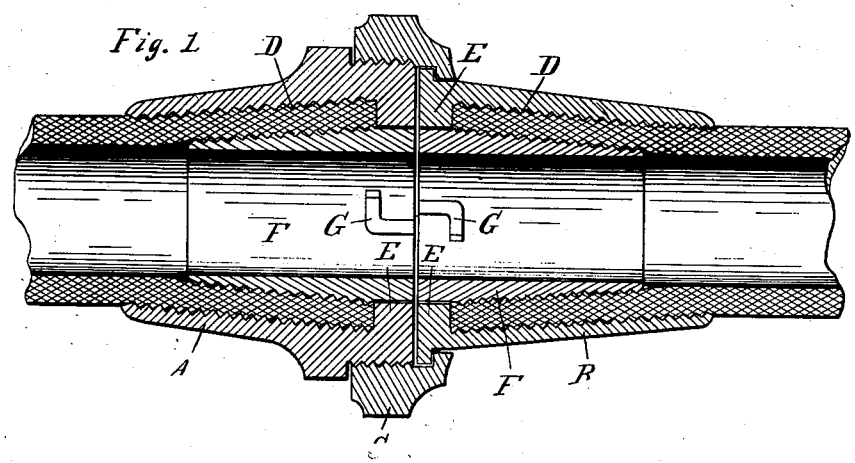
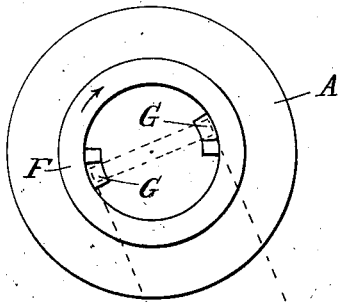
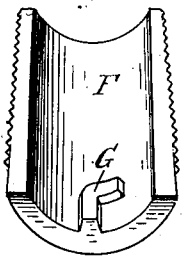
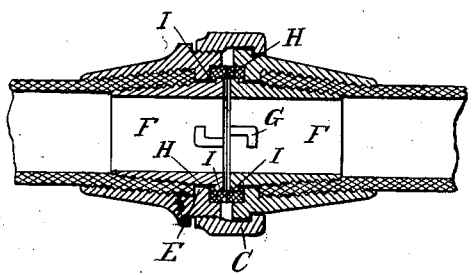
Witnesses:
C. M. Hulbert
John Schuman.
Inventor:
Robert A. Austin
By Thos. S. Sprague & Son
Atty.

UNITED STATES PATENT OFFICE.

ROBERT A. AUSTIN, OF SANDUSKY, OHIO.

HOSE-COUPLER.

SPECIFICATION forming part of Letters Patent No. 402,219, dated April 30, 1889.

Application filed July 26, 1888. Serial No. 281,079. (No model.)

*To all whom it may concern:*

Be it known that I, ROBERT A. AUSTIN, a citizen of the United States, residing at Sandusky, in the county of Erie and State of Ohio, have invented certain new and useful Improvements in Hose-Couplers, of which the following is a specification, reference being had therein to the accompanying drawings.

This invention relates to new and useful improvements in hose-couplings; and the invention consists in the improved means provided for securing the ends of a flexible hose to the respective halves of the coupling, as more fully hereinafter described, and set forth in the accompanying drawings, in which—

Figure 1 is a vertical central section through my improved hose-coupling; Fig. 2, an end view of one-half of the coupling; Fig. 3, a detached perspective view of a section of the expanding thimble, and Fig. 4 a longitudinal central section of a modification of my coupling.

A and B are two parts of the coupling proper. adapted to be coupled or uncoupled by an interiorly-threaded collar, C, which is loosely secured to one coupling, all as in the usual construction of couplings made for coupling ordinary hose.

For the purpose of attaching the ends of the hose in a more perfect manner to the halves of the coupling than by the means in present use, which are unsatisfactory to hold the hose under high pressure, I have devised the following means:

The couplings A and B are provided in the ends to which the hose connects with a tapering bore, D, which is screw-threaded or corrugated in imitation of screw-threads, and this tapering bore extends preferably to within a short distance of the meeting faces of the coupling, where an annular portion, E, projecting toward the inside, is left standing to form a stop for the inner ends of the hose, which is inserted into the bore of the coupling, and then expanded therein by means of the tapering thimble F, which is exteriorly screw-threaded and provided with a bore corresponding to the bore of the hose for which the coupling is provided, or nearly so.

G are L-shaped nibs formed upon the inside of the bore of the thimble, diametrically opposite each other, for the purpose of serving as a wrench-hold to screw the thimble in place, as shown in the drawings, and thereby expand the hose and firmly wedge it between the thimble and the coupling. The nibs G form a convenient means for firmly screwing the thimble F in place without the use of a special tool.

A convenient wrench may be made by bending over at right angles one end of an iron bar of suitable size to be inserted into the bore of the thimble, as shown in Fig. 2 in dotted lines. The L shape of the nibs forms the means for rotating the thimble and to bring pressure to bear to drive the thimble into the hose until the screw-thread takes hold. This operation may be thus easily carried out and still more facilitated by the use of a few drops of lubricant to reduce the friction of the thimble with the hose.

The coupling thus constructed is especially designed for coupling steam-hose wherein the ordinary means for holding the hose ends to the coupling are insufficient; but my invention may also be used for joining pipes of other soft material—such as lead—wherein the expanding may be done to a certain degree by an expanding-tool before the thimble is inserted.

A steam-tight joint may be easily obtained by placing a suitable gasket between the meeting ends of the coupling, as in the usual manner; but the coupling may be constructed with gaskets H permanently secured to it, as shown in Fig. 4, wherein the thimbles F are made the means for holding the gaskets firmly in place by being provided with annular flanges I, while the couplings A and B are suitably recessed to receive the gaskets.

The coupling-ring C may be provided with nibs on the outside to give a firm grip for the operator, or it may be of polygonal shape to afford a sufficient hold for a wrench.

Importance is attached to the shape of the ribs G, by means of which the thimble may be rotated and at the same time forced lengthwise into the hose until the screw-threads take hold. This cannot be done when simply a straight lug is employed.

What I claim as my invention is—

In a pipe or hose coupling, the coupling A, provided with a tapering bore threaded or corrugated, the annular stop E at the inner ends of the tapering bore, the tapering thimble F, exteriorly screw-threaded, and the L-shaped nibs G, formed in the interior of the thimble upon diametrically-opposite sides thereof, substantially as and for the purposes described.

In testimony whereof I affix my signature, in presence of two witnesses, this 6th day of June, 1888.

ROBERT A. AUSTIN.

Witnesses:
L. H. GOODWIN,
LINN W. HULL.